United States Patent [19]
Lostumo et al.

[11] Patent Number: 5,832,790
[45] Date of Patent: Nov. 10, 1998

[54] SELF CLEANING WIRE STRIPPER AND METHOD

[75] Inventors: Arthur J. Lostumo, Franklin Park; John K. Shaffstall, Gurnee, both of Ill.

[73] Assignee: Zenith Electronics Corporation, Glenview, Ill.

[21] Appl. No.: 656,126

[22] Filed: May 31, 1996

[51] Int. Cl.$^6$ ..................................................... H02G 1/12
[52] U.S. Cl. ............................................... 81/9.51; 81/9.4
[58] Field of Search ...................... 81/9.4, 9.51; 219/221, 219/227

[56] References Cited

U.S. PATENT DOCUMENTS 5,351,581  10/1994  Ito et al. .................................. 81/9.51

Primary Examiner—James G. Smith
Attorney, Agent, or Firm—Julio Garceran; Roland Norris

[57] ABSTRACT

The self-cleaning wire stripper includes a wire stripping element, such as an RF coil, which burns insulation from a segment of wire. A wire guide, such as a insulating burn tube, positioned within the wire stripping element guides the wire through the wire stripping element. The self-cleaning wire stripper uses a reamer having a wire channel such that the wire passes through the reamer. At the desired time, such as at the end of every burn operation, the reamer cleans the wire guide, resulting in no down time for tube removal/cleaning. The reamer cycle time is transparent to the process and does not slow down throughput because reaming occurs during the coil winding process.

19 Claims, 6 Drawing Sheets

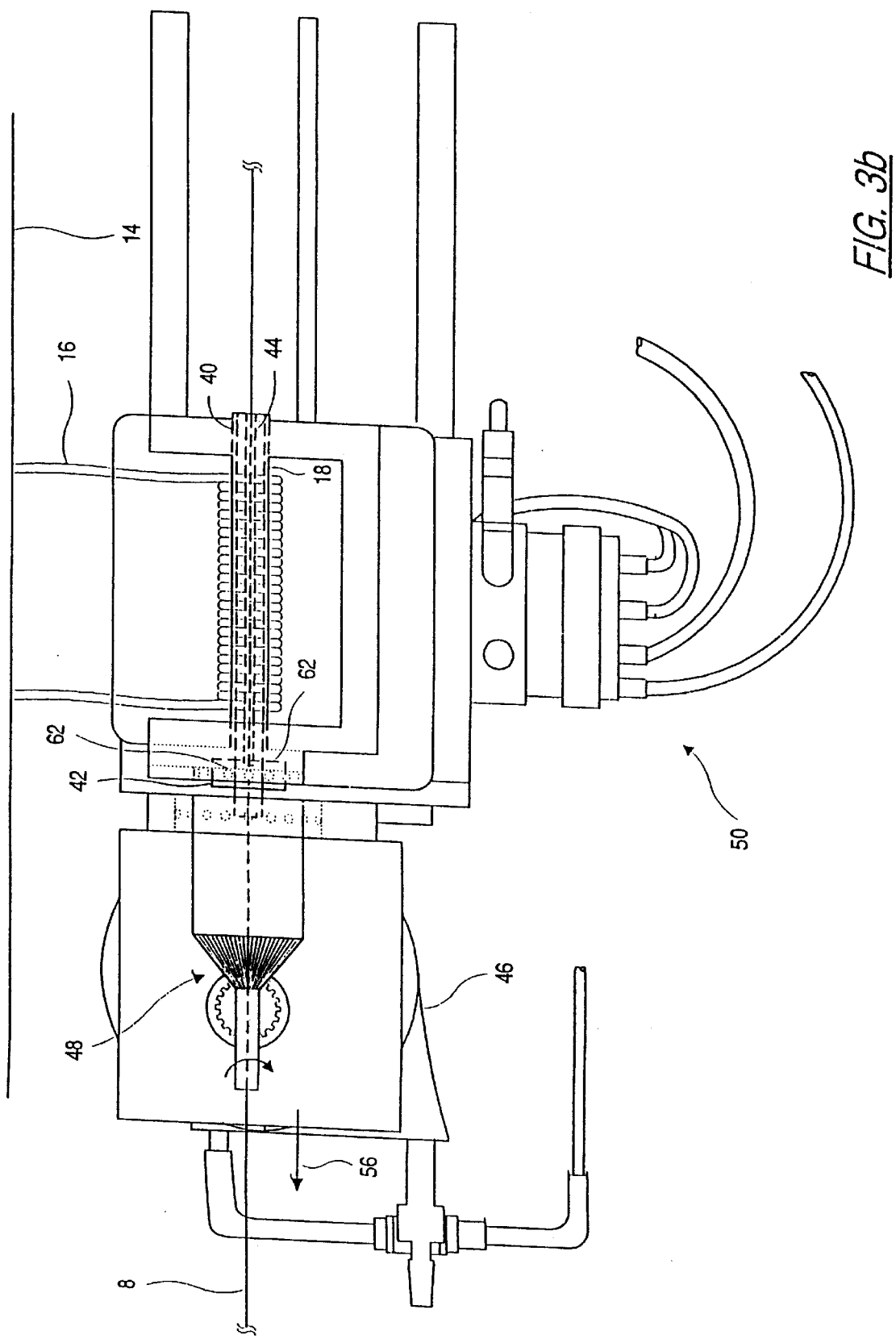

SELF CLEANING WIRE STRIPPER AND METHOD

FIELD OF THE INVENTION

The present invention relates generally to wire stripping and specifically to a wire stripper using a self cleaning system that removes residue accumulating on the wire stripper and resulting from the wire stripping operation.

BACKGROUND OF THE INVENTION

In forming high frequency coils used in the deflection yoke assemblies of cathode ray tubes (CRTs), wire stripping is necessary because the wires of the formed coils are fused by electrical current to retain their formed shape, so they can be placed in/on the deflection yoke core. The electrical contact of the wrap and forming machine must have a clean wire to contact for this fusing process.

The preferred wire for forming high frequency coils (necessary for high definition displays) is called Litz wire. It has more and finer strands than that ordinarily used for deflection coils. There are seven strands of 38 gauge wire in one rope of wire, and e.g., nine ropes braided together for one coil wrap line which is formed into shape. Consequently, 7×9=63 strands are bundled together in one wrap, with each strand having an insulating coating which needs to be burnt off so that fusing into the proper form can take place.

The insulation can be burnt off by the known means of RF burning the wrap when it is contained in a closed tube. FIG. 1 is a general diagram of a deflection coil forming machine using the closed tube technique for stripping a patch of the wire 8. A forming arbor 6 winds and shapes the wire 8 to form the saddle-shaped deflection coils. The wire 8 passes through an oil atomizer 9 which helps the wire 8 settle on the arbor 6. The wire 8 is fed from a spool 10 through a pulley assembly 12 to an RF frequency generator 14. A copper coil 16 is the load on the frequency generator 14, and the copper coil 16 is made of tubing such that coolant can run through it. As shown, the copper coil 16 surrounds a tube 18, referred to as a "burn tube," through which the wire 8 passes. The tube 18 is a ceramic cylinder which insulates the wire 8 to keep the frequency coil 16 from shorting the wire 8.

After a deflection coil (not shown) is formed on the arbor 6, the RF generator 14 is activated, and the coil 16 burns the insulation from a portion of the wire 8 within the burn tube 18. After the portion 20 of the wire 8 is stripped of insulation, the stripped wire portion 20 passes adjacent to an electric contact 22. At this point, the electric contact 22 contacts the wire 8 which fuses the saddle-shaped deflection coil on the arbor 6 due to the high current passing through the wire 8 between the electric contact 22 and another electric contact on the arbor 6. To properly fuse together the wound, multi-strand wire 8 which makes up the deflection coil on the arbor 6, a good contact on all the strands is important. Other forms of wire cleaning are known which use a "C burner," a knife scraper or a brush cleaner. The burn tube technique is preferred because it provides a clean burn which exposes all the stands of the wire 8, but the burn tube technique experiences clogging problems. Unfortunately, the residue from the burnt insulation rapidly accumulates within the tube 18, reducing burn efficiency and leaving residue which may contact the wire and foul the electrical contact necessary for fusing the wire 8. The coordination and timing of the various aspects of the deflection coil machine 4, including the wire stripping operation 24 is controlled by controller 26. The controller 26 can be a typical computer 28 with display 30, memory, processor, keyboard 32 and software which controls the operation of the deflection coil machine according to various parameters programmed into the controller 26.

OBJECTS OF THE INVENTION

It is an object of the present invention to provide an improved self-cleaning wire stripper and method which facilitates the throughput in a manufacturing process requiring wire stripping, such as the manufacture of deflection coils and the like, by not having to stop and clean the wire stripping apparatus.

It is another object of the present invention to provide an improved self-cleaning wire stripper and method which improves a manufacturing process requiring wire stripping, such as the manufacture of deflection coils and the like, by maintaining the wire stripping apparatus clean and not fouling the wire with residue.

It is still another object of the present invention to provide an improved self-cleaning wire stripper and method which improves burn efficiency in a manufacturing process requiring wire stripping, such as the manufacture of deflection coils and the like, by maintaining the wire stripping apparatus clean.

To accomplish this and other objects, a self-cleaning wire stripper and method are provided. The self-cleaning wire stripper includes a wire stripping element, such as an RF coil, which removes insulation from a segment of wire. A wire guide, such as an insulating burn tube, positioned within the wire stripping element contains the wire which passes through the wire guide and thereby through the wire stripping element. The self-cleaning wire stripper includes a cleaning assembly having a wire channel such that the wire passes through the cleaning assembly. At the desired time, such as at the end of every burn operation, the cleaning assembly cleans the wire guide, resulting in no down time for burn tube removal/cleaning. The cleaning assembly cycle time is transparent to the process and does not slow down throughput because cleaning occurs during the manufacturing process, such as the coil forming process.

In accordance with an embodiment according to the principles of the present invention, the self-cleaning wire stripper removes insulation from a wire, such as a Litz wire or a thin magnetic coil wire. An RF generator with a wire stripping element burns insulation from a segment of the wire. An insulating wire guide, such as a ceramic burn tube, within the wire stripping element contains the wire, and the wire passes through the wire guide and the wire stripping element. The burning of insulation from the segment of the wire leaves residue in the insulating wire guide. The wire goes through a hollow reamer and after the segment of the wire within the wire stripping element is burned, the hollow reamer rotates and moves through the insulating wire guide to clean the inside surface of the insulating wire guide. Afterward, the hollow reamer moves back out from the insulating wire guide for the next burn operation. Thus, the throughput of the deflection coil manufacturing process is not adversely affected because reaming takes place while the stripped patch on the wire is moved forward onto the electrical contact, thereby not requiring production stoppage for cleaning of residue and contaminants which might foul the stripped wire.

BRIEF DESCRIPTION OR THE DRAWINGS

Other aspects and advantages of the present invention may become apparent upon reading the following detailed description and upon reference to the drawings in which.

Figure 2A:
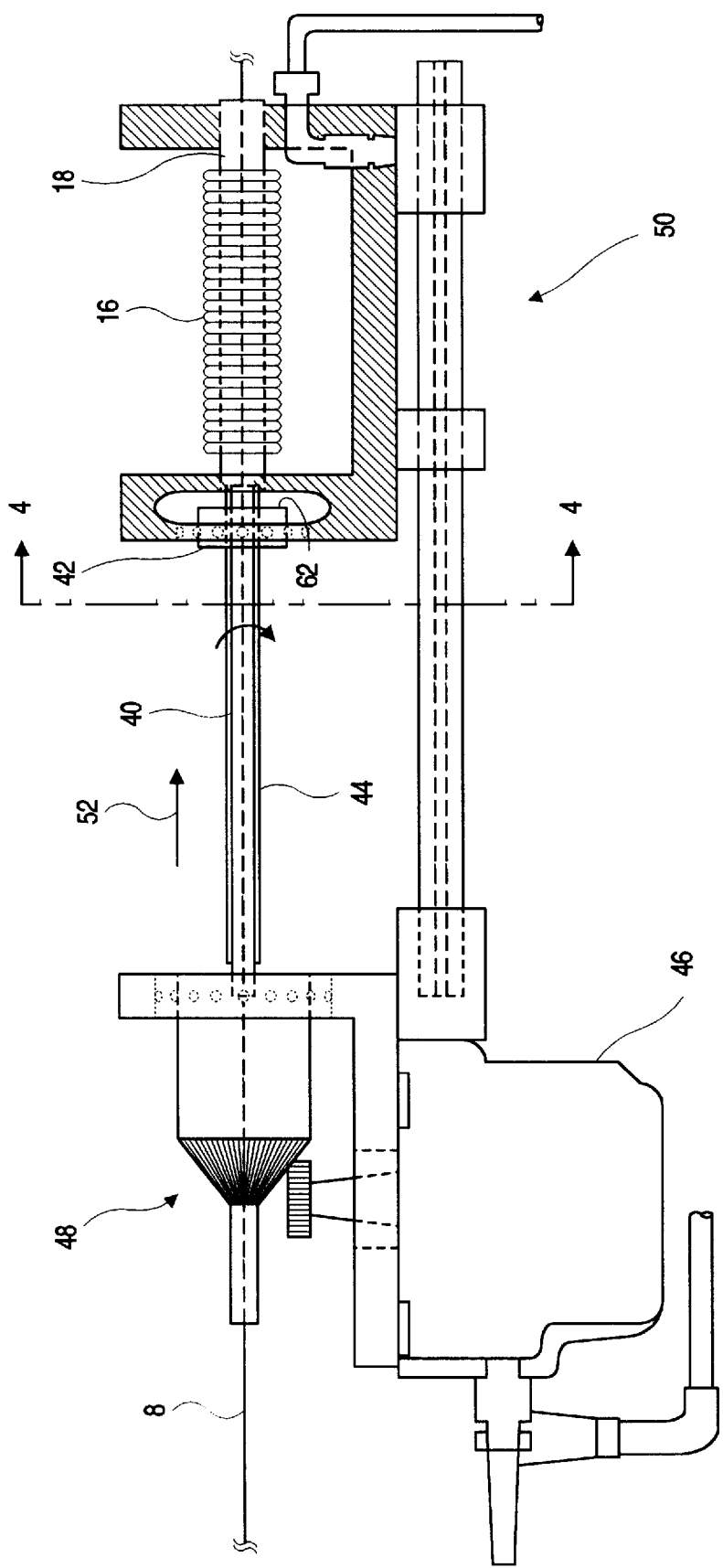
FIG. 2a shows a side view of the self-cleaning wire stripper with the reamer generally positioned outside the exposed burn tube according to the principles of the present invention.
Figure 3A:
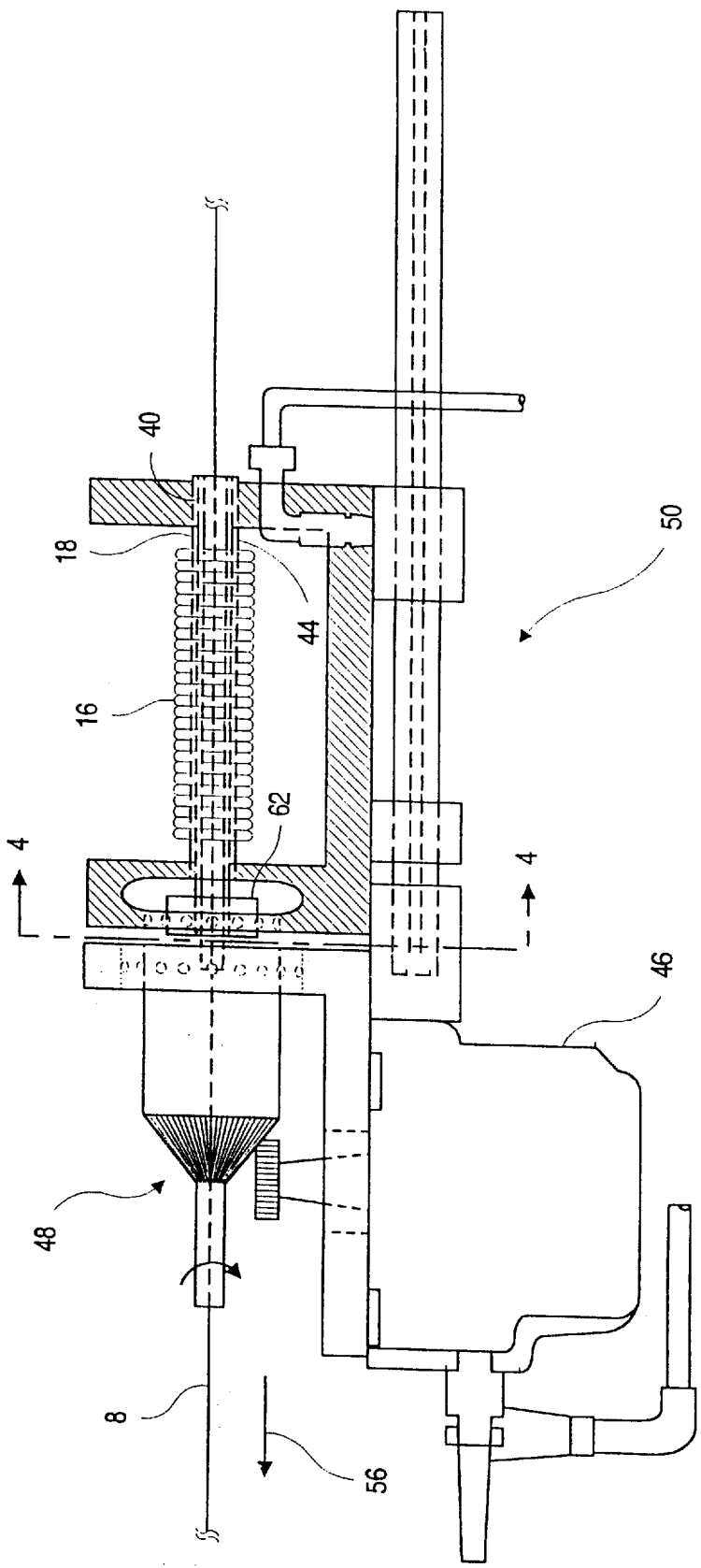
Figure 4:
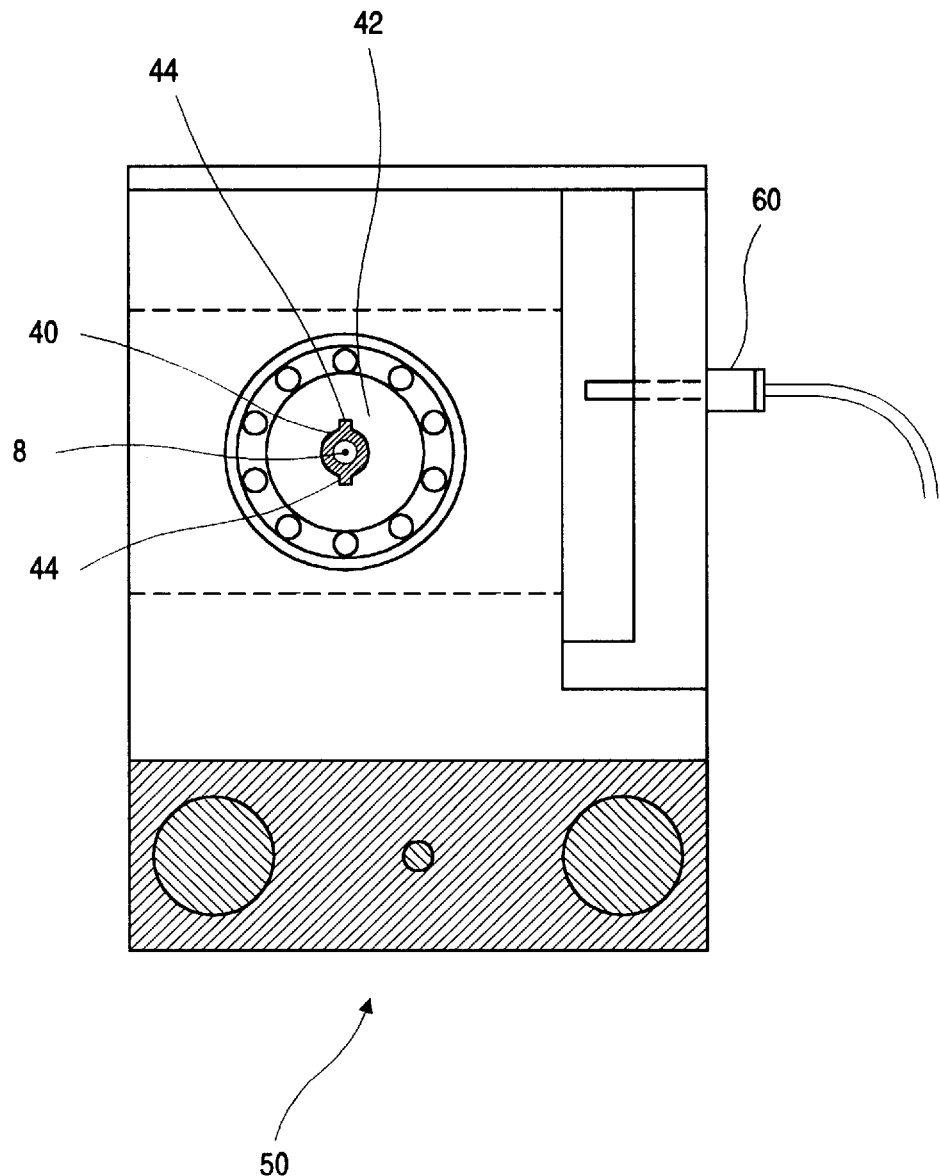

FIG. 3a shows a side view of the self-cleaning wire stripper with the reamer generally positioned within the exposed burn tube to clean residue from the inside surface of the burn tube according to the principles of the present invention; and FIG. 3b shows a top view of the self-cleaning wire stripper with the reamer generally positioned within the exposed burn tube to clean residue from the inside surface of the burn tube according to the principles of the present invention; and FIG. 4 shows an end view of the self-cleaning wire stripper along line 4—4 of FIG. 2a.

DETAILED DESCRIPTION OF THE PREFERRED EMBODIMENT

An illustrative embodiment of a self-cleaning wire stripper being used in a deflection coil forming machine is described below as it might be implemented to provide improved burn efficiency and increased throughput in the manufacturing of deflection coils.

Figure 1:
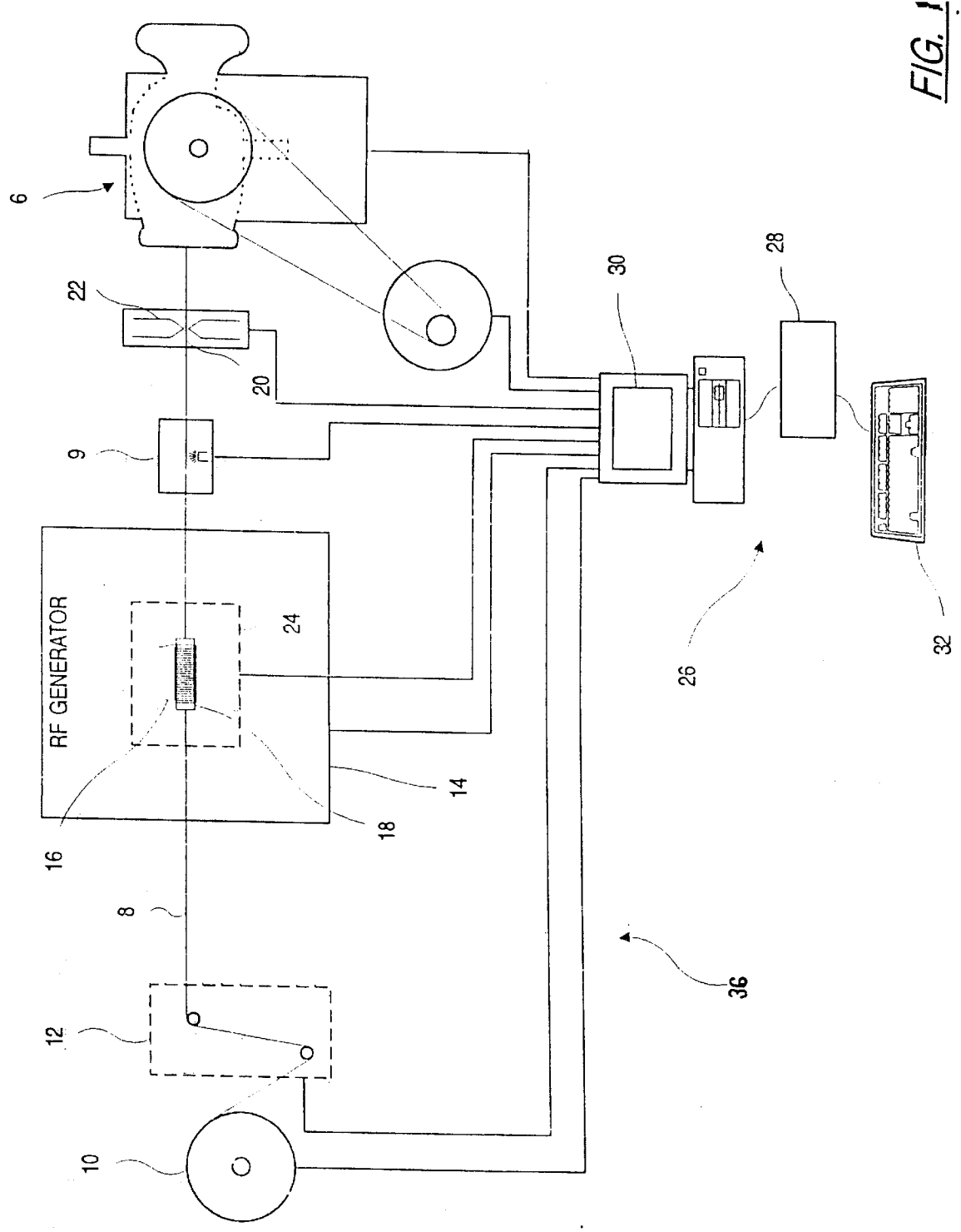
FIG. 1 shows a general diagram of a deflection coil forming machine.

With reference to FIG. 1, the self cleaning-wire stripper and method according to the principles of the present invention can be used with the wire stripping operation 24 of the deflection coil machine 4 to clean residue from the burn tube 18. In this particular embodiment, the burn tube 18, which is made of a ceramic, electrically-insulating, heat-resistant or other insulating material depending on the application, insulates the continuous wire 8 from the wire stripping element or RF coil 16 of an RF frequency generator 14 (FIG. 1). The wire guide 18 contains or surrounds the wire 8, and in this particular embodiment does not touch the wire 8. In this particular embodiment, the wire 8 passes through the burn tube 18 and the wire stripping element 16, and the coil 16 burns the insulation from a segment of the wire 8, which is Litz wire or a magnetic coil wire in this particular example. The burning of insulation from the segment of the wire leaves residue in the burn tube 18. The self-cleaning wire stripper cleans the residue from the insulating wire guide or burn tube 18 without affecting the coil forming process.

Figure 2B:
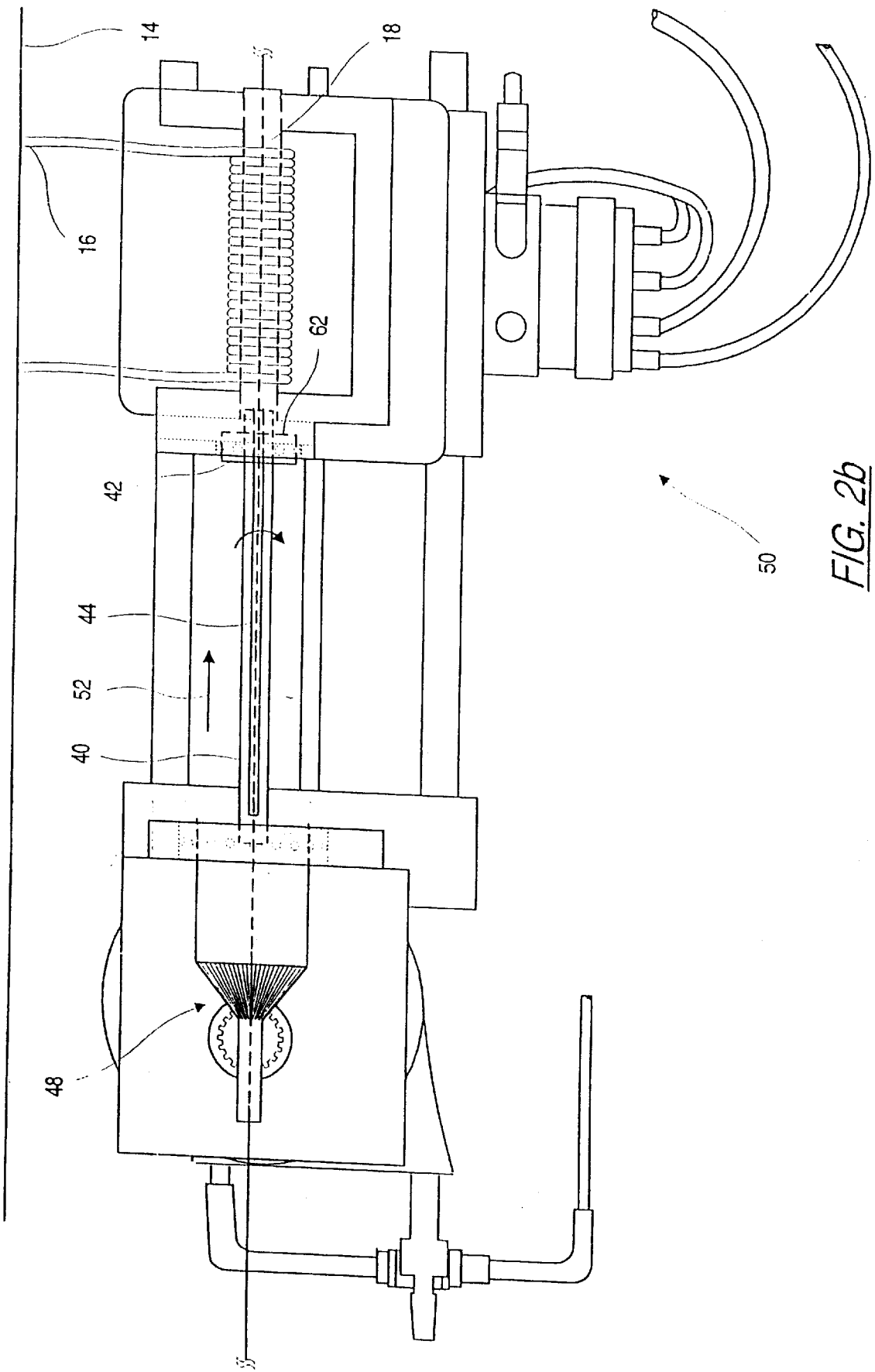
FIG. 2b shows a top view of the self-cleaning wire stripper with the reamer generally positioned outside the exposed burn tube according to the principles of the present invention.

In this particular embodiment, as shown in FIGS. 2a and 2b, the self-cleaning wire stripper 36 uses a reamer 40 which is in a sliding engagement with a wiper bearing 42 positioned adjacent to one end of the burn tube 18. This particular reamer 40 is substantially cylindrical and hollow such that the continuous wire 8 can pass through the reamer 40. The reamer 40 also has at least one blade 44 along at least a portion of the length of the reamer 40. In this particular embodiment, after the segment of the wire 8 is burned, the hollow reamer rotates, moves through the wiper bearing 42 into the insulating burn tube 18 to clean the inside surface of the burn tube 18. The reamer rotates under the power of an adjustable RPM air motor 46 coupled to the reamer 40 through a gear and bearing arrangement 48, and the reamer 40 moves relative to the burn tube 18 under the power of a pneumatic cylinder drive system 50. After the air motor 46 is activated to rotate the reamer 40, a forward transverse solenoid of the drive system 50 is activated after about a half-second delay to move the reamer 40 forward into the burn tube 18 as shown by arrow 52.

FIGS. 3a and 3b show the reamer 40 completely within the burn tube 18. At this point, the reamer 40 moves back out from the burn tube 18 as shown by arrow 56. In this particular embodiment, the reamer 40 is returned to its original position shown in FIGS. 2a and 2b by deenergizing the forward transverse solenoid of the drive system 50 and energizing the backward transverse solenoid of the drive system 50. As the reamer 40 moves back out from the insulating burn tube 18, the wiper bearing 42 wipes the residue from reamer 40. As shown in FIG. 4, a cleaning nozzle 60 blows away the excess residue that is wiped from the reamer 40 by the wiper bearing 42. The wiper bearing 42 effectively wipes off the residue from the reamer 40 because the wiper bearing 42 has a cross-sectional configuration which matches the cross-sectional configuration of the reamer 40. As such, as the reamer 40 moves back from the burn tube 18, the residue from the reamer 40 collects on wiping surface 62 (FIGS. 2a–3b) of the wiper bearing 42 When the reamer 40 is back in its original position, the backward transverse solenoid is deenergized.

The operation of the self-cleaning wire stripper 36 is controlled by controller 26 (FIG. 1) which coordinates the operation of the self-cleaning wire stripper 36 and the entire coil forming process. The controller 26 can be programmed for varying the operation of the self-cleaning wire stripper 26 depending on the particular application. In this particular embodiment, after a deflection coil (not shown) is formed on the arbor 6 (FIG. 1), the RF generator 14 is activated along with a timer which can be part of the controller 26, and the coil 16 burns the insulation from a portion of the wire 8 within the burn tube 18 according to the timer. After the portion 20 of the wire 8 is stripped of insulation and allowed to cool as measured by the timer, the stripped wire portion passes to the electric contact 22 for fusing of the deflection coil. At this point, the controller 26 activates the air motor 46 (FIGS. 2a–3b) which in this particular embodiment causes the reamer 40 to rotate. After a 0.5 second delay, the controller 26 activates the forward transverse solenoid (not shown) of the pneumatic cylinder drive system 50 to move the rotating reamer 40 into the burn tube 18.

The rotating reamer with blades 44 scrapes the residue of the burn operation from the inside surface of the burn tube 18. After the rotating reamer 40 has scraped essentially the entire inside surface of the burn tube 18, the controller 26 deenergizes the forward transverse solenoid of the pneumatic cylinder drive system 50 and energizes the backward transverse solenoid of the drive system 50 to move the rotating reamer 40 out of the burn tube 18. As the rotating reamer 40 moves from the burn tube 18, the wiper bearing wipes the residue from the reamer 40 as described above. Additionally, the controller 26 can activate the cleaning nozzle 60 to clear the residue from the wiper bearing 42. Once the reamer 40 is back to its original position, the controller 26 can deenergize the backward transverse solenoid of the drive system 40.

Thus, in this particular application, the self cleaning wire stripper can improve burn efficiency and the manufacturing process by continuously removing residue from the burn tube 18, thereby preventing residue from contacting the wire 8 and fouling the electrical contact necessary for fusing the wire 8. Furthermore, the self cleaning wire stripper improves manufacturing throughput by cleaning the wire path without requiring that the manufacturing process be stopped.

Those skilled in the art will readily recognize that these and various other modifications and changes may be made to the present invention without strictly following the exemplary application illustrated and described herein and without departing from the true spirit and scope of the present invention, which is set forth in the following claims. For example, in the illustrative embodiment, an air motor 46 and gear assembly 48 is used to rotate the reamer 40, and a pneumatic cylinder drive system 50 is used to move the reamer into and out of the burn tube 18. Instead, an electric motor, another type of motor or no motor could be used as well as a different type of drive system or no drive system. Moreover, the illustrative embodiment is described as being computer controlled, but the entire process or portions thereof could be performed manually.

We claim:

1. A self-cleaning wire stripper for removing insulation from a wire comprising:
    a) a wire stripping element which removes insulation from a segment of the wire;
    b) a wire guide within the wire stripping element through which the wire passes through the wire stripping element; and
    c) a cleaning assembly with a wire channel through which the wire passes through the cleaning assembly, and after a segment of the wire insulation is removed, means for moving the cleaning assembly into the wire guide to clean the inside surface of the wire guide.

2. The self-cleaning wire stripper of claim 1 wherein the cleaning assembly includes a substantially cylindrical, hollow tube, and the wire channel is the hollow portion of the cleaning assembly.

3. The self-cleaning wire stripper of claim 1 wherein the cleaning assembly includes a reamer with at least one blade along a length of the reamer.

4. The self-cleaning wire stripper of claim 1 wherein the wire stripping element which removes insulation from a segment of the wire is part of a RF generator.

5. The self-cleaning wire stripper of claim 1 further including a wiper bearing positioned adjacent to one end of the wire guide.

6. The self-cleaning wire stripper of claim 5 wherein the cleaning assembly is in a sliding engagement with the wiper bearing, the wire goes through the cleaning assembly and through the wire guide, after the segment of the wire is burned, means for moving the cleaning assembly through the wiper bearing and into the wire guide to clean the inside surface of the wire guide, means for moving the cleaning assembly back out from the wire guide, and as the cleaning assembly moves back out from the wire guide, the wiper bearing wipes the cleaning assembly.

7. The self-cleaning wire stripper of claim 1 wherein the cleaning assembly includes means for rotating while moving inside the wire guide.

8. The self-cleaning wire stripper of claim 7 wherein the means for rotating includes a gear assembly coupled to an adjustable RPM air motor.

9. The self-cleaning wire stripper of claim 1 wherein the means for moving the cleaning assembly into the wire guide includes a pneumatic cylinder drive system.

10. A self-cleaning RF wire stripper for removing insulation from a wire comprising:
    a) an RF generator with a wire stripping element which burns insulation from a segment of the wire;
    b) an insulating wire guide within the wire stripping element through which the wire passes through the wire stripping element, the burning of insulation from the segment of the wire leaves residue in the insulating wire guide;
    c) a wiper bearing positioned adjacent to one end of the insulating wire guide; and
    d) a cleaning assembly including:
        1) a hollow reamer in a sliding engagement with the wiper bearing, the wire goes through the hollow reamer and through the insulating wire guide,
        2) means for rotating the hollow reamer,
        3) means for moving the hollow reamer through the wiper bearing and into the insulating wire guide to clean the inside surface of the insulating wire guide,
        4) means for moving the hollow reamer back out from the insulating wire guide and as the hollow names moves out from the insulating wire guide, the wiper bearing wipes the hollow reamer.

11. The self-cleaning wire stripper of claim 10 wherein the wire is a magnetic coil wire for a deflection coil.

12. The self-cleaning wire stripper of claim 10 wherein the wire guide is made of a ceramic material.

13. The self-cleaning wire stripper of claim 10 wherein the reamer includes at least one blade along a length of the reamer.

14. The self-cleaning wire stripper of claim 10 wherein the means for rotating the reamer includes a gear assembly coupled to an adjustable RPM air motor.

15. The self-cleaning wire stripper of claim 10 wherein the means for moving the reamer into the wire guide includes a pneumatic cylinder drive system.

16. A method of cleaning a wire stripper for removing insulation from a wire comprising:
    a) burning insulation from a segment of the wire with a wire stripping element,
    b) passing the wire through the wire stripping element using a wire guide; and
    c) moving a reamer, having a wire channel for guiding the wire through the reamer, inside the wire guide after a segment of the wire is burned to clean the inside surface of the wire guide.

17. The method of claim 16 further including the steps of:
    a) moving the reamer through a wiper bearing and into the wire guide to clean the inside surface of the insulating wire guide;
    b) removing the reamer from the wire guide; and
    c) wiping the reamer with the wiper bearing.

18. The method of claim 16 further including the step of rotating the reamer while moving inside the wire guide.

19. A method of cleaning an RF wire stripper for removing insulation from a wire comprising:
    a) burning insulation from a segment of the wire using an RF generator with a wire stripping element;
    b) passing the wire through the wire stripping element using an insulating wire guide within the wire stripping element, the burning of insulation from the segment of the wire leaves residue in the insulating wire guide;
    c) positioning a wiper bearing adjacent to one end of the insulating wire guide;
    d) rotating a hollow reamer having a wire channel through which the wire passes through the hollow reamer;
    e) moving the hollow reamer through the wiper bearing and into the insulating wire guide to clean the inside surface of the insulating wire guide;
    f) removing the hollow reamer from the insulating wire guide; and
    g) wiping the hollow reamer with the wiper bearing as the hollow reamer moves back out from the insulating wire guide.

* * * * *